Sept. 22, 1970    R. THOMPSON    3,530,358
THREE-PHASE REGULATOR SYSTEMS
Filed March 8, 1968    4 Sheets-Sheet 1

WITNESSES:
Bernard R. Giequay
Leon M. Gannon

INVENTOR
Raymond Thompson
BY
Donald R. Lackey
ATTORNEY

Sept. 22, 1970

R. THOMPSON 3,530,358

THREE-PHASE REGULATOR SYSTEMS

Filed March 8, 1968

United States Patent Office

3,530,358
Patented Sept. 22, 1970

3,530,358
THREE-PHASE REGULATOR SYSTEMS
Raymond Thompson, Monroeville, Pa., assignor to Westinghouse Electric Corporation, Pittsburgh, Pa., a corporation of Pennsylvania
Filed Mar. 8, 1968, Ser. No. 711,748
Int. Cl. G05f 1/20; H02m 7/20
U.S. Cl. 321—5                                    10 Claims

ABSTRACT OF THE DISCLOSURE

Regulator apparatus for three-phase AC electrical systems. The regulator apparatus utilizes static switching means for changing tap connections on a transformer winding, in response to an error signal produced by the deviation of the quantity to be regulated from the desired magnitude.

BACKGROUND OF THE INVENTION

Field of the invention

The invention relates in general to regulator apparatus for three-phase AC systems, and more specifically to regulator apparatus of the type which includes static tap changer means.

Description of the prior art

Regulator apparatus of the prior art has utilized static tap changer means in single-phase alternating potential electrical systems. For example, United States Pat. 3,040,-239, issued June 19, 1962, discloses regulator apparatus of this type which utilizes two parallel connected static switches per transformer tap, and United States Pat. 3,275,929, issued Sept. 27, 1966, discloses regulator apparatus of this type which uses a single-phase, full-wave bridge rectifier and a single static switch per transformer tap. With the development of the bilateral AC switches, such as the triac, it is possible that a single bilateral AC switch may be used per transformer tap.

A direct application of the prior art teachings to three-phase electrical systems provides apparatus having substantially three times the cost, size and weight of the single-phase apparatus. It would be desirable to be able to reduce the size, cost, weight and complexity of three-phase regulator systems of this type, but these objectives must be achieved without a substantial impairment of the regulating capabilities of the apparatus.

SUMMARY OF THE INVENTION

Briefly, the present invention discloses new and improved three-phase regulator apparatus of the type which utilizes static tap changer means. One embodiment of the invention teaches the use of transformer means having first, second and third windings, each having first and second ends, and static tap changer means connected adjacent the first end of each of the windings. The three windings are connected in a delta configuration, with their second ends being connected to a point near the first end of another of the windings. This provides symmetrical control of all three phases, without resorting to a complex interconnection of the phases.

Another embodiment of the invention provides control of all three phases while using transformer means having first and second windings, with each winding having static tap changer means associated therewith. The first and second windings are connected in an open delta configuration.

Still other embodiments of the invention teach controlling two of the three phases of a three-phase electrical system, while utilizing a single static tap changer arrangement.

BRIEF DESCRIPTION OF THE DRAWINGS

Further advantages and uses of the invention will become more apparent when considered in view of the following detailed description and drawings, in which.

DESCRIPTION OF THE PREFERRED EMBODIMENT

Figure 1:
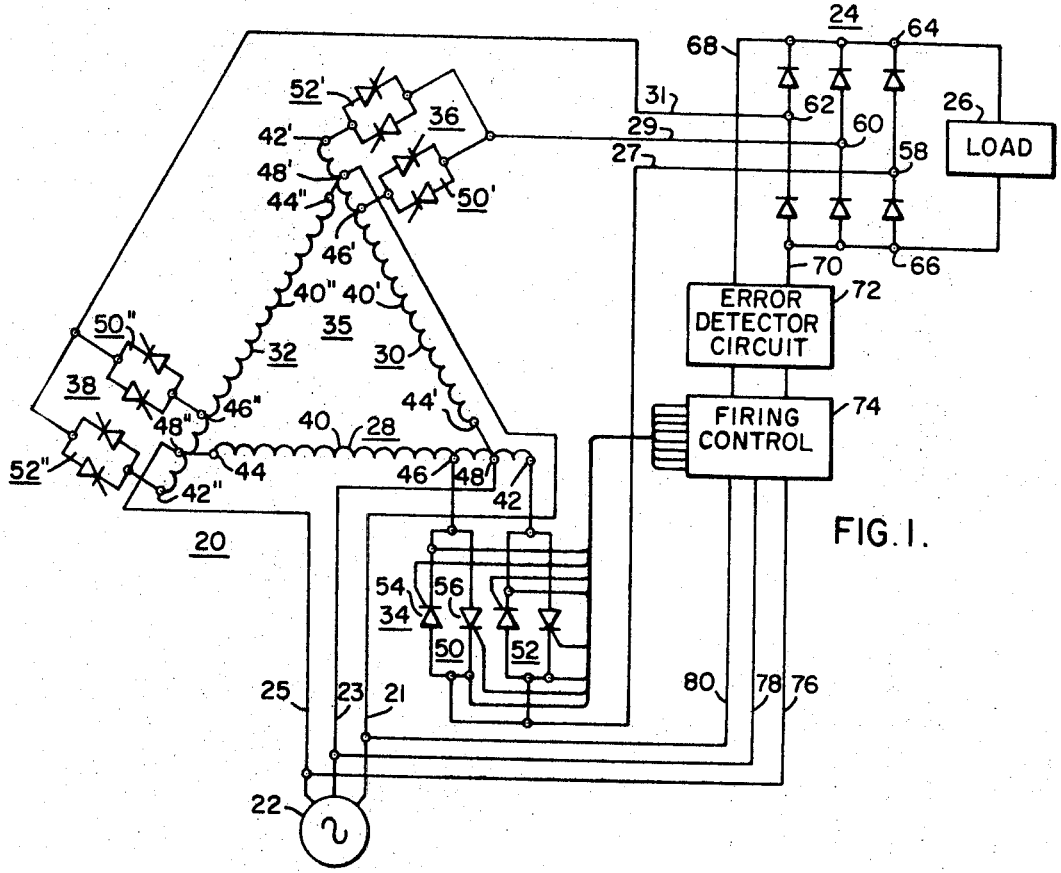
FIG. 1 is a schematic diagram of three-phase regulator apparatus constructed according to an embodiment of the invention.

Referring now to the drawings, and FIG. 1 in particular, there is shown a schematic diagram of three-phase regulator apparatus 20, constructed according to an embodiment of the invention. Regulator apparatus 20 is connected to a source 22 of three-phase alternating potential via conductors 21, 23 and 25, and, in this instance, the regulated output voltage of the regulator 20 is connected to a three-phase, full-wave bridge rectifier 24, via conductors 27, 29 and 31. The bridge rectifier 24 is connected to a direct current load 26.

Regulator apparatus 20 includes transformer means 35 which has at least three windings, and for purposes of example is illustrated as including first, second and third autotransformers 28, 30 and 32. Each autotransformer 28, 30 and 32 has a static tap changer arrangement connected to at least two different points of potential on the autotransformer winding. Specifically, autotransformer 28 has a static tap changer arrangement 34, autotransformer 30 has a static tap changer arrangement 36, and autotransformer 32 has a static tap changer arrangement 38. Since each autotransformer and its associated static tap changer arrangement is similar in construction and arrangement, only autotransformer 28 and its associated tap changer arrangement 34 will be described in detail.

Autotransformer 28 includes a winding 40 having taps or terminals 42 and 44 at its first and second ends, respectively. Winding 40 has a tap 46 disposed adjacent its first end, with the electrical distance from the end tap or terminal 42 being determined by the intended control range of the regulator 20. One of the three line conductors from source potential 22, such as conductor 23, is also connected adjacent the first end of winding 40, with its location being determined by the requirements of the particular application. For example, if it is desired to be able to buck or boost the voltage from source 22, winding 40 may have a tap connection 48 disposed intermediate the tap connections 46 and 42. This embodiment is illustrated in FIG. 1, with conductor 23 being connected to tap connection 48. Or, if it is desired to only boost the source voltage, or to only buck the source voltage, conductor 23 would be connected to tap connection 46, or to terminal 42, respectively.

The static tap changer means 34 associated with winding 40 includes first and second bilateral AC switching means 50 and 52 each connected to points of different potential on winding 40. Specifically, bilateral AC switching means 50 is connected to tap connection 46 on winding 40, and bilateral AC switching means 52 is connected to tap connection 42 on winding 40. For purposes of example, each bilateral AC switching means, such as bilateral AC switching means 50, is illustrated as comprising two controlled rectifiers 54 and 56 connected in inverse parallel, but one static switching device connected across the output terminals of a single-phase, full-wave bridge rectifier may be used for each tap connection, or a single bilateral AC switching device may be used per tap. The ends of bilateral AC switching means 50 and 52, opposite to the ends which are connected to winding 40, are connected in common to conductor 27.

The windings and associated static tap changer means of autotransformers 30 and 32 are given the same reference numerals as like components of autotransformer 28 and its associated tap changer means 34, with the reference numerals associated with autotransformer 30 being given a single prime mark, and the reference numerals associated with autotransformer 32 being given a double prime mark. For example, autotransformer 30 includes a winding 40' having terminals 42' and 44' at its first and second ends, respectively, tap connections 46' and 48', and its associated static tap changer means 36 includes bilateral AC switching means 50' and 52' associated with tap connections 46' and 42', respectively. The ends of bilateral switching means 50' and 52', opposite their connections to winding 40', are connected in common to conductor 29. Autotransformer 32 includes a winding 40" having terminals 42" and 44" at its first and second ends, respectively, tap connections 46" and 48", and its associated static tap changer means 38 includes first and second bilateral AC switching means 50" and 52" associated with tap connections 46" and 42", respectively. The ends of bilateral AC switching means 50" and 52", opposite their connections to winding 40", are connected in common to conductor 31.

Windings 40, 40' and 40" of transformer means 35 are interconnected into a delta configuration, by connecting the first end of each of the windings to the second end of another of the windings. For example, terminal 44' of winding 40' may be connected to tap connection 48 of winding 40, terminal 44" of winding 40" may be connected to tap connection 48' of winding 40', and terminal 44 of winding 40 may be connected to tap connection 48" of winding 40".

The regulated AC output voltage of regulator apparatus 20 may be connected to an AC or DC load. For purposes of this example, regulator 20 is illustrated in FIG. 1 connected to the input terminals 58, 60, and 62 of a three-phase, full-wave bridge rectifier 24, via conductors 27, 29 and 31, respectively. The output terminals 64 and 66 of bridge rectifier 24 are connected to a load 26, such as an electric welder.

The output voltage of bridge rectifier 24 may be held constant by varying the AC input voltage applied to its input terminals 58, 60 and 62, as the magnitude of the load 26 changes and/or the magnitude of the source potential 182 changes. A measure of the output voltage of bridge rectifier 24 may be obtained via conductors 68 and 70 which are connected to the DC output terminals 64 and 66 of bridge rectifier 24. Or, alternatively, the AC output voltage of the regulator may be monitored and used to provide the error signal. This measure of the DC output voltage is applied to an error detector circuit 72, which provides a signal having a magnitude responsive to the deviation of the DC output voltage from the pre-selected magnitude. The error signal provide by error detector circuit 72 is applied to suitable firing control means 74, which provides switching pulses for the static tap changer means 34, 36 and 38. Conductors from the firing control means 74 are shown connected only to the switching devices of static tap changer means 34, in order to simplify the drawing, but the firing control 74 is connected to the switching devices of static tap changer means 36 and 38 in a similar manner. In order to properly synchronize the firing pulses with the line voltages across each of the windings 40, 40' and 40", the firing control 74 is connected to the source 22 of three-phase alternating potential via conductors 76, 78 and 80.

Suitable error detector circuits and firing control circuits are well known in the art, and it is not necessary that they be described in detail. Also, the operation of the static tap changer means 34, 36 and 38 is known in the art, being described in detail in the hereinbefore mentioned United States patents. In general, each of the static tap changer means operates by starting each voltage half cycle on the lower voltage tap connection associated with bilateral AC switching means 50, 50' and 50", and at a point during the voltage half cycle determined by the error signal, the tap changer means switches to the higher voltage tap associated with bilaterial AC switching means 52, 52' and 52". In other words, the ratio of the time during each voltage half cycle which bilateral AC switching means 50 and 52 conduct, is controlled by the error signal to provide desired control, such as a regulated output voltage. Thus, at the start of each voltage half cycle a signal is applied to one of the switching devices of the bilateral AC switching means 50, 50' and 50", with device 56 being switched to its conductive condition when the first end of the winding is more positive than the second end, i.e., at the start of the positive going voltage half cycle, and device 54 will be switched to its conductive condition when the second end is more positive than the first end, i.e., at the start of the negative going voltage half cycle. A signal will then be applied to one of the switching devices of the bilateral AC switching means 52, 52' and 52", at a point during the voltage half cycle determined by the magnitude of the error signal. The three-phase voltage output of regulator apparatus 20, thus follows the voltage waveform of the voltage between tap connections 44 and 46, between tap connections 44' and 46', and between tap connections 44" and 46", until a device in the bilateral AC switching means associated with tap connections 42, 42' and 42" is switched to its conductive condition. The switching devices which were conducting in the bilateral AC switching means 50, 50' and 50" will then be switched to their non-conductive conditions, and the windings 40, 40' and 40'' will then be connected to bridge rectifier 24 through tap connections 42, 42' and 42''. Therefore, at this switching point in the voltage half cycles, the waveforms will change to follow the voltage across tap connections 44 and 42 of winding 40, across tap connections 44' and 42'' of winding 40''. The average or effective output voltage of each regulated output voltage will be somewhere between the voltage across tap connections 44 and 46, and the voltage across tap connections 44 and 42 of winding 40, and the similar tap connections of the other windings. The ratio of transformer means 35 is thus effectively changed at a point during each half cycle which will provide the desired regulated magnitude of DC potential across the load 26.

Figure 2:
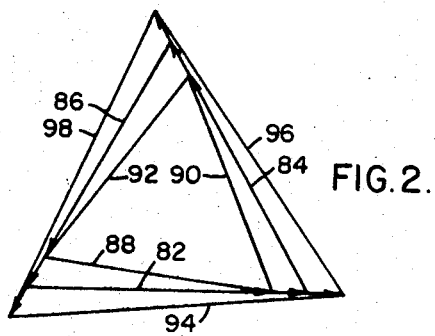
FIG. 2 is a vector diagram explanatory of the operation of the regulator apparatus shown in FIG. 1.

FIG. 2 is a vector diagram which illustrates how the output voltage of regulator 20 changes from its minimum magnitude to its maximum magnitude. Vectors 82, 84 and 86 represent the line voltages across tap connections 44 and 48 of winding 40, across tap connections 44' and 48' of winding 40', and across tap connections 44'' and 48'' of winding 40''. Vectors 88, 90 and 92 illustrate the minimum output voltage of regulator 20, which occurs when the magnitude of the error signal is such that the regulator operates from tap connections 46, 46' and 46'' throughout a complete voltage half cycle. Vectors 94, 96 and 98 illustrate the maximum output voltage of regulator apparatus 20, which occurs when the magnitude of the error signal is such that the regulator operates from tap connections 42, 42' and 42'' for substantially all of each voltage half cycle. The output voltage of regulator apparatus 20 can be continuously varied between the minimum and maximum values by changing the angle in each voltage half cycle at which the tap connections are effectively changed.

Figure 3:
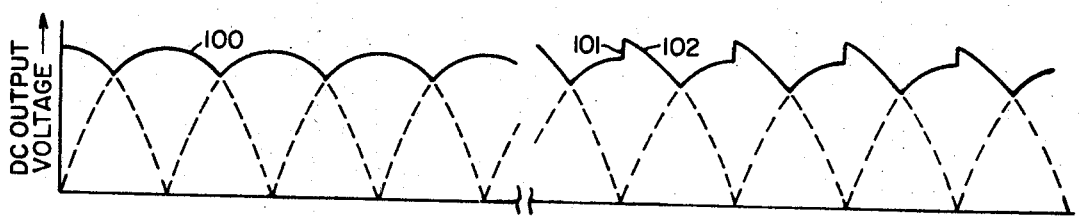
FIG. 3 is a graph which illustrates the full-wave rectified waveform of the output voltage of the regulator apparatus shown in FIG. 1.

FIG. 3 is a graph which illustrates the regulated DC output voltage of bridge rectifier 24. Waveform 100 illustrates the DC waveform when the regulator is at its minimum and maximum output points and waveform 102 illustrates the DC waveform when the AC input voltage to rectifier 24 is the same as the nominal line voltage. The step 101 in each ripple cycle indicates the switching point from the lower voltage to the higher voltage tap points in each of the transformer windings.

Figure 4:
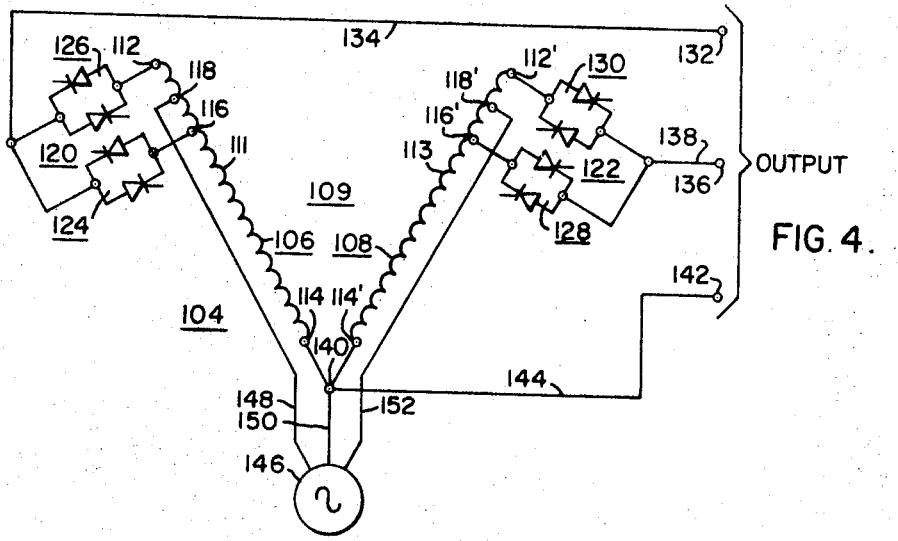
FIG. 4 is a schematic diagram of three-phase regulator apparatus constructed according to another embodiment of the invention.

FIG. 4 is a schematic diagram of a regulator system 104 constructed according to another embodiment of the invention. Regulator apparatus 104 includes transformer means 109 having at least two windings. For purposes of this example, the two windings are illustrated as being autotransformers 106 and 108. Autotransformers 106 and 108 have windings 111 and 113, respectively, connected in an open delta or V arrangement, which arrangement provides regulation of all three of the AC line voltages.

Autotransformers 106 and 108 may be similar to the autotransformers 28, 30 and 32 hereinbefore described, with winding 111 of autotransformer 106 having tap connections or terminals 112 and 114 at its first and second ends, and tap connections 116 and 118. Winding 113 of autotransformer 108 has similar terminals or tap connections given the same reference numerals as those of autotransformer 106, but with the addition of a single prime mark.

Windings 111 and 113 have static tap changer means 120 and 122, respectively, with tap changer means 120 having first and second bilateral AC switching means 124 and 126. Bilateral AC switching means 124 is connected to tap connection 116, and bilateral AC switching means 126 is connected to tap connection 112. The ends of bilateral switching means 124 and 126, opposite to the ends which are connected to winding 111, are connected in common to output terminal 132 via conductor 134.

Tap changer means 122 associated with autotransformer 108, has first and second bilateral switching means 128 and 130, with bilateral AC switching means 128 being connected to tap connection 116', and bilateral AC switching means 130 being connected to tap connection 112'. The ends of bilateral AC switching means 128 and 130, opposite to the ends which are connected to winding 113, are connected in common to output terminal 136 via conductor 138.

Although each of the autotransformers 106 and 108, and their associated static tap changer means 120 and 122, respectively, are similar to the autotransformers and their associated static tap changer means shown in FIG. 1, it is important to note that they are interconnected in a different manner. Specifically, the autotransformers shown in FIG. 1 are interconnected with the second end of one autotransformer being connected to the first end of another autotransformer. If the two autotransformers shown in FIG. 4 were to be interconnected in this manner, the output voltage of the regulator would be symmetrical at only one specific output voltage. In other words, merely removing one winding from the delta configuration of regulator 20 shown in FIG. 1, will not provide a regulator system which provides a symmetrical three-phase output across its regulating range.

In the embodiment of the invention shown in FIG. 4, regulator apparatus 104 has windings 111 and 113 of transformer means 109 interconnected such that their seconds ends or terminals 114 and 114' are connected in common at terminal 140. Terminal 140 is connected to output terminal 142 via conductor 144.

Regulator apparatus 104 is connected to a source 146 of three-phase alternating potential via conductors 148, 150 and 152. Conductor 148 is connected to tap connection 118, conductor 150 is connected to terminal 140, and conductor 152 is connected to tap connection 118'. The three-phase output voltage of regulator apparatus 104 appears across terminals 132, 136 and 142, which may be applied to an AC or a DC load. Error detector means and firing control means may be used to control the tap change point of the static tap changer means 120 and 122, as hereinbefore described relative to FIG. 1, to regulate a predetermined quantity of the load circuit, such as the load voltage.

Figure 5:
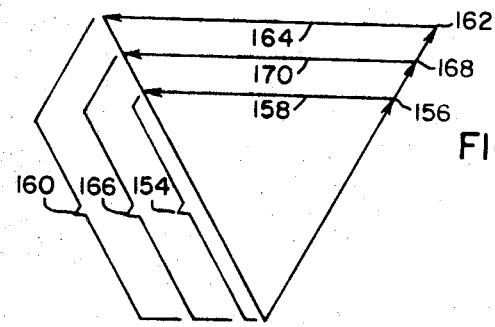
FIG. 5 is a vector diagram explanatory of the operation of the regulator apparatus shown in FIG. 4.

FIG. 5 is a vector diagram which illustrates that symmetrical three-phase control is achieved over the output voltage appearing at terminals 132, 136 and 142. The minimum output voltage from windings 111 and 113 is represented by vectors 154 and 156, respectively, and the third voltage, which appears across terminals 132 and 136, is represented by vector 158. Since the angle between vectors 154 and 156 is constant, and since the magnitude of vectors 154 and 156 are similar, the magnitude of the third line voltage represented by vector 158 will be the same as the magnitude of the other two line voltages.

The maximum output voltage of regulator apparatus 104 is illustrated in vector diagram FIG. 5 by vectors 160, 162 and 164. Vector 160 represents the voltage across winding 111, vector 162 represents the voltage across winding 113, and vector 164 is the resulting line voltage which appears across terminals 132 and 136. Again, the length of vector 164 is the same as the length of vectors 160 and 162, illustrating that symmetrical control has been maintained. Vectors 166, 168 and 170 illustrate the output of regulator apparatus 104 when the output voltage is the same as the nominal input voltage.

The regulator apparatus 104 shown in FIG. 4 not only maintains complete symmetrical control over the three-phase output voltage while using only two static tap changer arrangements, but it provides its control without shifting the phases of the three line voltages as the regulator goes from minimum to maximum output voltage. This is unlike the regulator apparatus 20 shown in FIG. 1, which changes the phase angle of the line voltages as the regulator maintains symmetrical control from minimum to maximum output. This is illustrated clearly in the vector diagram of FIG. 2.

Figure 6:
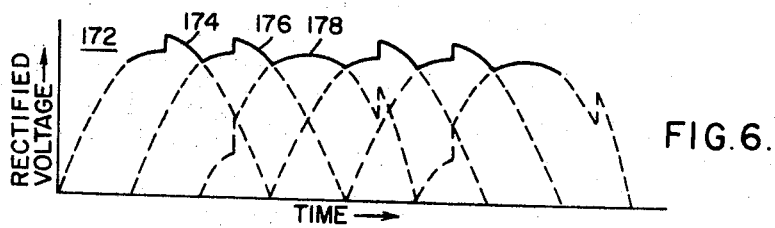
FIG. 6 is a graph which illustrates the full-wave rectified waveform of the output voltage of the regulator apparatus shown in FIG. 4.

FIG. 6 is a graph which illustrates a voltage waveform 172 which would be obtained if the output of regulator 104, shown in FIG. 4 were to be connected to a three-phase, full-wave bridge rectifier, such as the bridge rectifier 24 shown in FIG. 1.

Figure 7:
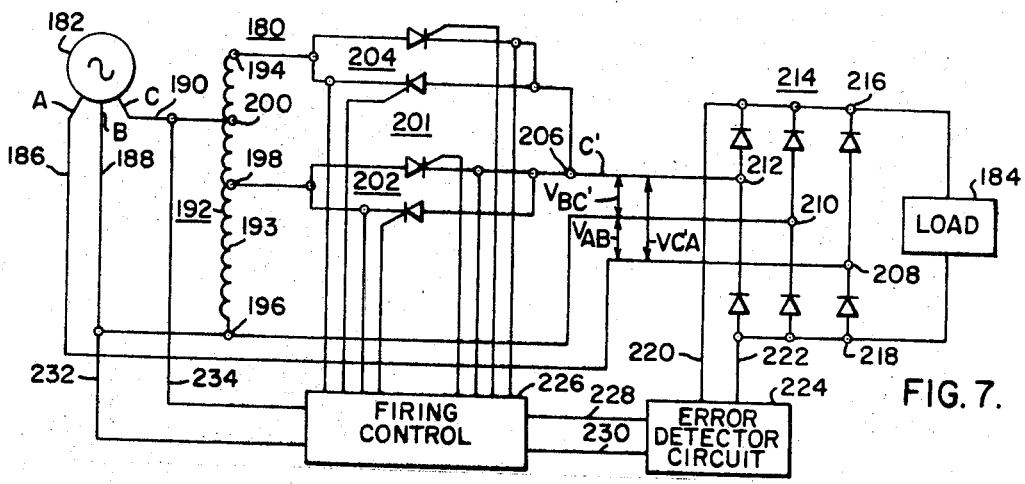
FIG. 7 is a schematic diagram of three-phase regulator apparatus constructed according to another embodiment of the invention.

In some applications, something less than a perfectly symmetrical three-phase output voltage may be tolerated. For example, where the regulated output is applied to a three-phase, full-wave bridge rectifier circuit, DC loads connected to the output of the bridge rectifier will tolerate some degree of non-uniformity in the ripple produced by the three line voltages. FIG. 7 is a schematic diagram of an embodiment of the invention wherein only one of the three line voltages of a three-phase alternating potential system is regulated, but regulator control is achieved for a period of time substantially longer than one-third of the time.

More specifically, FIG. 7 illustrates a regulator system 180 connected between a source 182 of three-phase alternating potential, and a DC load 184. Source potential 182 has conductors 186, 188 and 190, which will be called the A, B and C conductors, respectively. The line voltage across conductors BC is directly regulated by regulator system 180. Regulator system 180 includes transformer means having at least one winding, such as an autotransformer 192 having a winding 193. Winding 193 has terminals or tap connections 194 and 196 at its first and second ends, respectively, and tap connections 198 and 200 disposed at pre-selected points intermediate its ends. Line conductor B is connected to terminal 196 of winding 193, and if it is desirable to be able to buck and to boost the line voltage, line conductor C may be connected to tap connection 200 on winding 193, which is disposed intermediate the tap connections 198 and 194.

Winding 193 has static tap changer means 201 associated therewith, which has first and second bilateral AC switching means 202 and 204, which may be similar to the bilateral AC switching means hereinbefore described relative to FIGS. 1 and 4. Bilateral AC switching means 202 is connected to tap connection 198, and bilateral AC switching means 204 is connected to tap connection 194. The ends of bilateral AC switching means 202 and 204, opposite to the ends connected to winding 193, are connected in common at junction 206. Line conductors A and B and junction 206 are connected to the AC input terminals 208, 210 and 212, respectively, of a three-phase, full-wave bridge rectifier circuit 214, which has its DC output terminals 216 and 218 connected to a DC load 184. The conductor from junction 206 to terminal 212 of bridge rectifier 214 will be called the C' conductor, since it represents the continuation of the C conductor after passing through the regulator apparatus 180.

As hereinbefore described relative to FIG. 1, the switching devices of bilateral AC switching means 202 and 204 may obtain firing or switching signals, properly phased with respect to the voltage across winding 193, by obtaining a measure of the DC voltage across terminals 216 and 218 via conductors 220 and 222, and applying this measure to error detector circuit 224. Or, the AC output voltage of the regulator may be used to develop an error signal. Error detector circuit 224 compares its measure with a reference, and provides an error signal responsive to any difference, which is applied to firing control means 226 via conductors 228 and 230. In order to synchronize firing control means 226 with the line voltage across winding 193, firing control 226 is connected across the B and C line conductors via conductors 232 and 234, respectively.

Instead of regulator apparatus 180 providing control one-third of the time which might be expected since only one line voltage is directly controlled, it is found that another of the line voltages is indirectly controlled. The regulator apparatus 180 thus provides some type of control for substantially two-thirds of the time.

Further, it is important to note that there are two ways to connect the regulator apparatus 180, with each arrangement having advantages when applied to certain types of loads. More specifically, it has been found that the periods of regulator control can be shifted relative to the three ripple cycles from the three AC line voltages. By connecting the regulator apparatus 180 such that the unregulated line voltage $V_{AB}$ leads the directly regulated line voltage $V_{BC}'$, the regulator current starts at the zero crossing of the directly regulated line voltage $V_{BC}'$. This connection is illustrated vectorially in FIG. 8. Vector 236 represents the unregulated line voltage $V_{AB}$, vectors 238, 240 and 242 represent the directly regulated line voltage $V_{BC}'$ for minimum, nominal and maximum output of the regulator apparatus 180, and vectors 244, 246 and 248 represent the indirectly regulated line voltage $V_{C'A}$ for minimum, nominal and maximum output of the regulator apparatus 180. It will be noted that the unregulated line voltage $V_{AB}$ leads the directly regulated line voltage $V_{BC}'$ by 120°.

Figure 8:
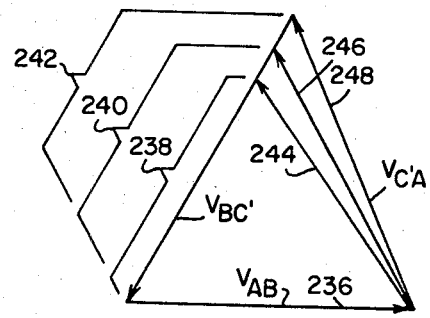
FIG. 8 is a vector diagram explanatory of the operation of the regulator apparatus shown in FIG. 7, when the unregulated line voltage leads the directly regulated line voltage.
Figure 9:
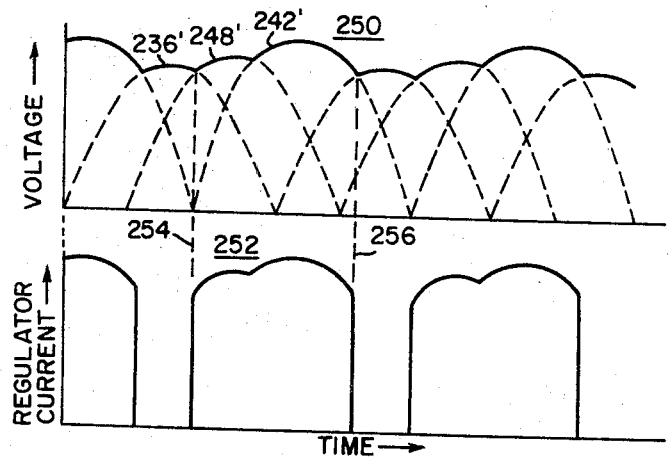
FIG. 9 is a graph which illustrates the rectified output voltage and regulator current when the regulator apparatus shown in FIG. 7 is operated according to the vector diagram shown in FIG. 8.

FIG. 9 is a graph which illustrates the output voltage waveform 250 from three-phase, full-wave bridge rectifier circuit 214 shown in FIG. 7, for the connection of the regulator apparatus 180 illustrated vectorially in FIG. 8, wherein the unregulated line voltage leads the directly regulated line voltage. The waveform 250 illustrates the configuration of the rectified output voltage of rectifier 214 for the maximum output of regulator apparatus 180, with ripple cycle 236' illustrating the vector 236 for the unregulated line voltage $V_{AB}$, ripple cycle 248' illustrating the vector 248 for the indirectly regulated line voltage $V_{C'A}$ and ripple cycle 242' illustrating the vector 242 for the directly regulated line voltage $V_{BC}'$.

Since the regulator 180 is providing control during the time of the ripple cycles 248' and 242', the regulator current waveform 252, as shown in FIG. 9, will start at the beginning of ripple cycle 248', indicated by dotted line 254, and it will end at the completion of ripple cycle 242', indicated by dotted line 256. It will be noted that the regulator current starts at the zero crossing of the directly regulated line voltage, and ends before the end of the half cycle of the directly regulated line voltage. Therefore, regulator control over the last portion of the directly regulated line voltage $V_{BC}'$ is not possible. If the net load presented to the regulator ever has a lagging power factor, a certain portion of the beginning of the directly controlled line voltage $V_{BC}'$ may also be lost, since switching too soon in the half cycle with a lagging power factor load may turn on a switching device associated with a higher voltage tap before the current has reached zero in the conducting switching device associated with the lower voltage tap, producing a short circuit across the tapped winding section. The connection represented by the vector diagram shown in FIG. 8, however, may be conveniently used where the load on the regulator will only have a unity or net leading power, since it would not be desirable to switch during the last portion of the directly controlled voltage half cycle. Therefore, the connection of the regulator will inherently prevent any switching of the devices in the last portion of the controlled voltage half cycle which may cause a short circuit with leading power factor loads.

The connection of regulator apparatus 180 represented by the vector diagram shown in FIG. 8, wherein the unregulated line voltage leads the directly regulated line voltage, would also have a disadvantage when the gate drive for the switching devices of the static tap changer means is derived directly from the line voltage being directly regulated, as the regulator requires load current at the start of the directly regulated voltage half cycle. Since control would not be possible until the gate drive reaches a level suitable for firing the switching devices, regulator control would not be able to start at dotted line 254, but would have to wait until the regulated waveform reached a suitable value, sufficient to provide gate drive. Therefore, this connection of the regulator apparatus 180, when the gate drive is derived directly from the line voltage being regulated, would narrow the control range of the regulator.

Now, assume that regulator apparatus 180 is connected such that the uncontrolled line voltage lags the directly regulated line voltage. In other words, line voltage $V_{AB}$ may be chosen to be directly regulated, which will cause line voltage $V_{CA}$ to be indirectly regulated, and line voltage $V_{BC}$ to be unregulated. This connection is illustrated in the vector diagram of FIG. 10, wherein vectors 258, 260 and 262 illustrate the directly regulated line voltage $V_{AB}$ for minimum, nominal and maximum regulator output, respectively, vectors 264, 266 and 268 illustrate the indirectly regulated line voltage $V_{CA}$ for minimum, nominal and maximum regulator output, respectively, and vector 270 illustrates the unregulated line voltage $V_{BC}$.

Figure 10:
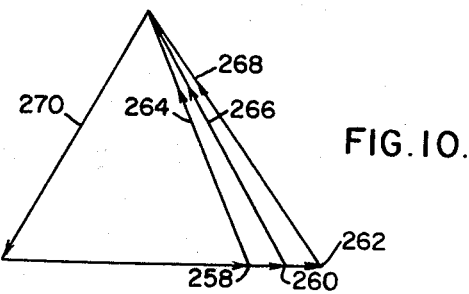
FIG. 10 is a vector diagram explanatory of the operation of the regulator apparatus shown in FIG. 7, when the unregulated line voltage lags the directly regulated line voltage.
Figure 11:
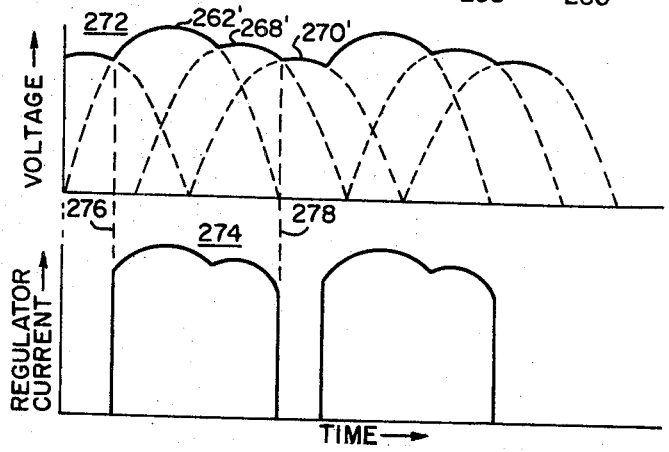
FIG. 11 is a graph which illustrates the rectified output voltage and regulator current when the regulator apparatus shown in FIG. 7 is operated according to the vector diagram shown in FIG. 10.

FIG. 11 illustrates the rectified voltage and regulator current waveforms for the connection of regulator apparatus 180 illustrated by the vector diagram of FIG. 10. Waveform 272 illustrates the rectified output voltage of the three-phase, full-wave bridge rectifier 214 as shown in FIG. 7, for the maximum output of regulator 180. Ripple cycle 262' represents vector 262, which is the directly regulated line voltage, ripple cycle 268' represents vector 268, which is the indirectly regulated line voltage, and ripple cycle 270' represents vector 270, which is the unregulated line voltage.

The regulator 180 has control during ripple cycles 262' and 268', and thus the regulator current waveform 274 starts at the beginning of ripple cycle 262', illustrated by dotted line 276, and it ends at the finish of ripple cycle 268', illustrated by dotted line 278. With this connection of the regulator apparatus 180, it will be noted that the regulator load current doesn't start to flow until the directly regulated voltage half cycle has reached a substantial magnitude, and that the regulator continues to supply current until the directly regulated voltage half cycle has reached zero. Thus, when the directly regulated line voltage is used to provide gate drive for the switching devices of the regulator apparatus 180, the magnitude of the directly regulated voltage half cycle is of sufficient magnitude to properly switch the devices as soon as regulator control is possible. Further, the connection of regulator apparatus 180, such that the unregulated line voltage lags the directly regulated line voltage, is advantageous when the regulator 180 will be connected to loads having a lagging power factor. It would not be desirable to switch during the initial portion of the directly controlled voltage half cycle, because of the possibility of short circuiting the tapped winding portion. Since the regulator has no control over the rectified output voltage of the bridge during the initial portion of the directly controlled line voltage, protection against switching at a point which may cause a short circuit can be provided without narrowing the theoretical control range.

It will be noted from observing the rectified voltage waveforms in FIGS. 9 and 11, that upon maximum regulator output, the ripple cycles are unsymmetrical. The same would also be true for minimum regulator output. The only time the ripple cycle would be completely symmetrical would be upon nominal input. When the load connected to the regulator apparatus is a rectifier and a DC load, this is usually not a disadvantage.

Figure 12:
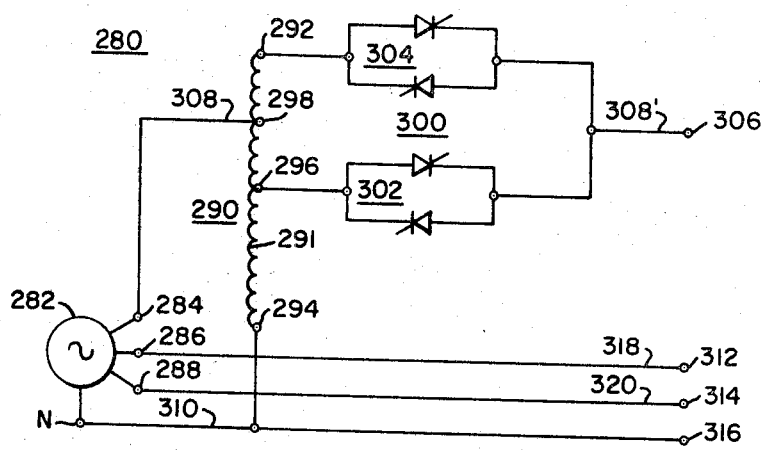
FIG. 12 is a schematic diagram of three-phase regulator apparatus constructed according to another embodiment of the invention.

A more symmetrical regulator output voltage may be obtained, still using a single static tap changer arrangement, when the source neutral is available. FIG. 12 is a schematic diagram illustrating an embodiment of the invention when the source neutral is available.

Specifically, FIG. 12 illustrates a regulator system 280 connected to a source 282 of three-phase alternating potential, having output terminals 284, 286 and 288, and a neutral terminal N. Regulator 280 may be similar to regulator apparatus 180 shown in FIG. 7, having transformer means, such as an autotransformer 290, which has terminals 292 and 294 at its first and second ends, and tap connections 296 and 298. Static tap changer means 300 is connected to winding 291 of autotransformer 290, with static tap changer means 300 having first and second bilateral AC switching means 302 and 304. Bilateral AC switching means 302 is connected to tap connection 296, and bilateral AC switching means 304 is connected to tap connection 292, on winding 291. The ends of bilateral AC switching means 302 and 304, opposite to the ends which are connected to winding 291, are connected in common to one of the output terminals of regulator apparatus 280, such as an output terminal 306 via conductor 308'.

Winding 291 is connected from one of the output terminals of source potential 282 to the neutral terminal N. For example, as shown in FIG. 12, output terminal 284 of source potential 282 may be connected to tap connection 298 on winding 291 via conductor 308. Terminal 294 of winding 291 is connected to the neutral terminal N via conductor 310. The remaining output terminals of regulator 280, 312 and 314 may be connected to terminals 286 and 288 of the source potential. If the neutral is required to be available at the load, an additional output terminal 316 may be connected to the neutral terminal N of source potential 282 via the conductor 310.

Figure 13:
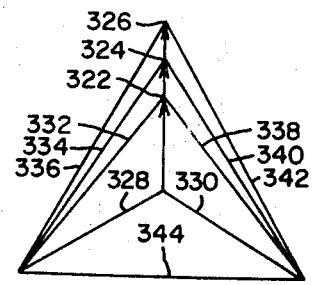
FIG. 13 is a vector diagram explanatory of the operation of the regulator apparatus shown in FIG. 12.

The operation of regulator apparatus 280 shown in FIG. 12 is illustrated in the vector diagram of FIG. 13. Vectors 322, 324 and 326 illustrate the directly regulated phase voltage between terminal 284 and the neutral terminal N of the source potential 282, for minimum, nominal and maximum regulator output voltages, respectively. Vectors 328 and 330 illustrate the unregulated phase voltages, between terminals 286 and N and between terminals 288 and N, of the source potential.

While only one of the phase voltages is regulated, it is apparent from the vector diagram shown in FIG. 13 that two of the line voltages will be indirectly regulated, and further, that the regulation of these two line voltages will be symmetrical. For example, for minimum regulator output, two of the line voltages are represented by equal vectors 332 and 338. When the regulator output increases to the value of its nominal input voltage, two of the line voltages increase symmetrically, and are represented by the equal vectors 334 and 340. When the regulator output increases to its maximum value, two of the line voltages increase symmetrically and are represented by the equal vectors 336 and 342.

Figure 14:
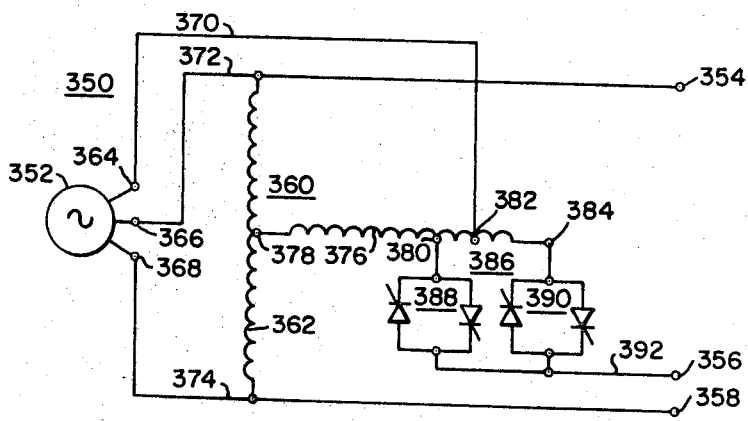
FIG. 14 is a schematic diagram of three-phase regulator apparatus constructed according to another embodiment of the invention.

Symmetrical control of two line voltages may be achieved with a single static tap changer arrangement, even when the source neutral is not available. FIG. 14 is a schematic diagram which represents this embodiment of the invention. Specifically, FIG. 14 illustrates a regulator system 350 connected to a source 352 of three-phase alternating potential via conductors 370, 372 and 374, and to output terminals 354, 356 and 358 via conductors 372, 392 and 374, respectively. Regulator system 350 includes transformer means 360 having a winding 362 connected across two of the conductors from source 352, such as conductors 372 and 374, and a winding 376 which is connected to the electrical center of winding 362 at terminal 378, and to the remaining line conductor 370 from source 352. Winding 376 is disposed at an angle of 90 electrical degrees with respect to winding 362. Winding 376 has tap connections 380 and 382 and a terminal 384, with tap connection 382 being connected to line conductor 370.

Tap connection 380 and terminal 384 of winding 376 are connected to static tap changer arrangement 386, similar to those hereinbefore described, which has a first bilateral AC switching means 388 connected to tap connection 380, and a second bilateral AC switching means 390 connected to terminal 384. The first and second bilateral AC switching means 388 and 390 have their ends, opposite to those which are connected to winding 376, connected in common to conductor 392 and to the output terminal 356.

Figure 15:
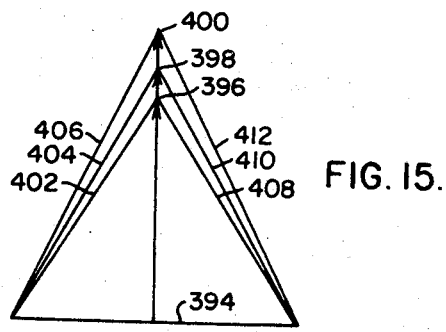
FIG. 15 is a vector diagram explanatory of the operation of the regulator apparatus shown in FIG. 14.

Symmetrical control of two line voltages is provided by the regulator arrangement 350 shown in FIG. 14, which is illustrated by the vector diagram shown in FIG. 15. Vector 394 illustrates the unregulated line voltage, appearing between output terminals 354 and 358, across which winding 362 is connected. Vectors 396, 398 and 400 represent the voltage across winding 376 for minimum, nominal and maximum regulator output voltages. As shown in FIG. 15, the voltage across winding 376 is 90° out of the phase with the voltage across winding 362. The other two line voltages appear between terminals 356 and 354, and between terminals 356 and 358. The line voltage between terminals 356 and 354 is illustrated by vectors 402, 404 and 406, representing minimum, nominal and maximum regulator output voltages, respectively, and the line voltage between terminals 356 and 358 is illustrated by vectors 408, 410 and 412, which represent minimum, nominal and maximum regulator output voltages, respectively. It will be noted that as the voltage across winding 376 changes that the two dependent line voltages change symmetrically.

In summary, there has been disclosed new and improved regulator systems for three-phase alternating potential networks, which utilize three similar regulator units in one embodiment of the invention, two similar regulator units in another embodiment, and a single regulator unit in other embodiments of the invention. Full symmetrical control of the three-phase alternating potential is achieved in the embodiment which utilize the two and three regulator unit arrangements, while regulator control is achieved for approximately two-thirds of the time in the single regulator unit embodiments.

Since numerous changes may be made in the above described apparatus, and different embodiments of the invention may be made without departing from the spirit thereof, such as adding one or more additional taps connected to additional bilateral AC switching means, using transformers with isolated windings, instead of autotransformers, and/or changing the location of the AC connections to the transformer winding relative to the connections of the bilateral AC switching means, it is intended that all matter contained in the foregoing description, or shown in the accompanying drawings, shall be interpreted as illustrative and not in a limiting sense.

I claim as my invention:

1. A regulator system comprising:
   a plurality of input terminals adapted for connection to a source of three-phase alternating potential,
   at least first, second and third output terminals adapted for connection to a load circuit,
   transformer means including an electrical winding having a plurality of turns,
   static tap changer means having first and second bilateral AC switching means, said first and second bilateral AC switching means being connected from said first output terminal to different turns on said electrical winding,
   one of said input terminals being connected to said electrical winding,
   another of said input terminals being connected to said electrical winding and to said second output terminal,
   still another of said input terminals being connected to said third output terminal,
   error signal means providing a signal responsive to the deviation of the quantity to be regulated from the desired value,
   and firing means connected to said error signal means and to said first and second bilateral AC switching means, providing switching pulses for said first and second bilateral AC switching means during each half cycle of the voltage across said winding, with the ratio of the conductive time of the first to the second bilateral AC switching means being responsive to the signal from said error signal means.

2. The regulator system of claim 1 wherein the plurality of input terminals include first, second and third terminals, adapted for connection to the three line conductors of a source of three-phase alternating potential, with two of said first, second and third terminals being the input terminals connected to the electrical winding.

3. The regulator system of claim 1 wherein the plurality of input terminals include first, second, third and fourth terminals, with the first, second and third input terminals being adapted for connection to the three line conductors of a source of three-phase alternating potential, and the fourth terminal being adapted for connection of the neutral conductor of the source of three-phase alternating potential, and wherein the input terminal connected to the electrical winding and the second output terminal is said fourth input terminal.

4. A regulator system comprising:
   first, second and third input terminals adapted for connection to a source of three-phase alternating potential,
   first, second and third output terminals adapted for connection to a load circuit,
   transformer means having a winding connected to said first and second input terminals,
   said second and third input terminals being connected to said second and third output terminals, respectviely,
   static tap changer means having first and second bilateral AC switching means, said first and second bilateral AC switching means being connected to points of different potential on said winding, said first and second bilateral AC switching means being connected to said first output terminal,
   error signal means providing a signal responsive to the deviation of the quantity to be regulated from the desired value,
   and firing means connected to said error signal means and to said first and second bilateral AC switching means, providing switching pulses for said first and second bilateral AC switching means during each half cycle of the voltage across said winding, with the ratio of the conductive time of the first to the second bilateral AC switching means being responsive to the signal from said error signal means.

5. The regulator system of claim 4 wherein the voltage across said first and second input terminals leads the voltage across said second and third input terminals.

6. The regulator system of claim 5 wherein said output terminals are connected to a three-phase, full-wave bridge rectifier.

7. The regulator system of claim 4 wherein the voltage across said second and third input terminals leads the voltage across said first and second input terminals.

8. The regulator system of claim 7 wherein said output terminals are connected to a three-phase, full-wave bridge rectifier.

9. A regulator system comprising:
   first, second, third and neutral input terminals adapted for connection to the first, second and third line voltages and neutral, respectively, of a source of alternating potential,
   first, second and third output terminals adapted for connection to a load circuit,
   transformer means having a winding connected to said first and neutral terminals,
   said second and third input terminals being connected to said second and third output terminals respectively,
   static tap changer means having first and second bilateral AC switching means, said first and second bilateral AC switching means being connected to points of different potential on said winding, said first and second bilateral AC switching means being connected to said first output terminal,
   error signal means providing a signal responsive to the deviation of the quantity to be regulated from the desired value, and firing means connected to said error signal means and to said first and second bilateral AC switching means, providing switching pulses for said first and second bilateral AC switching means during each half cycle of the voltage across said winding, with the ratio of the conductive time of the first to the second bilateral AC switching means being responsive to the signal from said error signal means.

10. The regulator system of claim 9 wherein said first input terminal is connected intermediate the points of different potential on said winding to which said first and second bilateral AC switching means are connected.

References Cited

UNITED STATES PATENTS

| | | | |
|---|---|---|---|
| 1,914,193 | 6/1933 | Bedford | 323—43.5 |
| 3,335,259 | 8/1967 | Mulder et al. | 323—43.5 X |
| 3,444,457 | 5/1969 | Rosa | 323—43.5 X |

J D MILLER, Primary Examiner

W. H. BEHA, JR., Assistant Examiner

U.S. Cl. X.R.

321—20; 323—24, 43.5